US012757298B2

(12) United States Patent
Hoff et al.

(10) Patent No.: US 12,757,298 B2
(45) Date of Patent: Oct. 6, 2026

(54) APPARATUS AND METHOD TO CONTROL ELECTROMAGNETIC HEATING OF CERAMIC MATERIALS

(71) Applicant: Government of the United States of America, as represented by the Secretary of the Air Force, Kirtland AFB, NM (US)

(72) Inventors: Brad Winston Hoff, Albuquerque, NM (US); David Michael French, Portland, OR (US)

(73) Assignee: United States of America as represented by the Secretary of the Air Force, Kirtland AFB, NM (US)

( * ) Notice: Subject to any disclaimer, the term of this patent is extended or adjusted under 35 U.S.C. 154(b) by 1001 days.

(21) Appl. No.: 17/853,343

(22) Filed: Jun. 29, 2022

(65) Prior Publication Data

US 2022/0361298 A1 Nov. 10, 2022

Related U.S. Application Data

(62) Division of application No. 15/605,846, filed on May 25, 2017, now Pat. No. 11,470,693, which is a (Continued)

(51) Int. Cl.
*H05B 6/02* (2006.01)
*H05B 6/00* (2006.01)

(Continued)

(52) U.S. Cl.
CPC ................ *H05B 6/02* (2013.01); *H05B 6/00* (2013.01); *H05B 6/46* (2013.01); *H05B 6/64* (2013.01); *H05B 6/68* (2013.01)

(58) Field of Classification Search
CPC ... H05B 6/00; H05B 6/02; H05B 6/04; H05B 6/46; H05B 6/48; H05B 6/64; H05B 6/68; H05B 6/80; Y02B 30/00
See application file for complete search history.

(56) References Cited

U.S. PATENT DOCUMENTS 3,017,516 A * 1/1962 Von Hippel ............. H01J 1/34
250/214 R
3,663,088 A 5/1972 Maldonado et al.

(Continued)

FOREIGN PATENT DOCUMENTS

EP 0456786 A1 11/1991
EP 0979595 B1 4/2000

(Continued)

OTHER PUBLICATIONS

Allison, J., Chapters 6.3 "Conduction processes in semiconductors" and 6.4 "Density of carriers in intrinsic semiconductors," pp. 107 through 117, Electronic Engineering Semiconductors and Devices, McGraw-Hill, London, 1990.

(Continued)

*Primary Examiner* — Hung D Nguyen
(74) *Attorney, Agent, or Firm* — AFNWC/JA; David L. Narciso, Sr.

(57) ABSTRACT

An electrode is embedded in a piece of ceramic material having a population of conduction band electrons. Applying a voltage bias to the electrode causes electrons to flow towards or away from the electrode to form a positively charged sheath either a distance apart from or adjacent the electrode, depending the polarity of the bias. The electron flow also forms a negatively charged sheath lying opposite the positively charged sheath, and an electrically neutral region lying between the two sheaths. Electromagnetic radiation impinging the ceramic material heats the ceramic where the radiation is absorbed by the electron population.

(Continued)

As the incident radiation is absorbed in proportion to the electron density, heating is increased in the negatively charged sheath, relative to the other parts of the ceramic material. The location of heating is controlled by controlling the magnitude and polarity of the voltage bias.

11 Claims, 7 Drawing Sheets

Related U.S. Application Data division of application No. 14/205,354, filed on Mar. 11, 2014, now abandoned.

(60) Provisional application No. 61/780,636, filed on Mar. 13, 2013.

(51) Int. Cl.

*H05B 6/46* (2006.01)
*H05B 6/64* (2006.01)
*H05B 6/68* (2006.01)

(56) References Cited

U.S. PATENT DOCUMENTS

| | | | |
|---|---|---|---|
| 4,323,056 | A | 4/1982 | Borrelli et al. |
| 4,963,709 | A | 10/1990 | Kimrey, Jr. |
| 5,633,073 | A | 5/1997 | Cheung et al. |
| 6,993,898 | B2 | 2/2006 | Parkin |
| 2003/0029379 | A1 | 2/2003 | Onogawa et al. |
| 2004/0232893 | A1 | 11/2004 | Odagawa et al. |
| 2005/0191827 | A1 * | 9/2005 | Collins ............ H01J 37/32082 438/513 |
| 2010/0025394 | A1 | 2/2010 | Jussel et al. |
| 2012/0267830 | A1 | 10/2012 | Maginnis et al. |
| 2013/0220800 | A1 | 8/2013 | Lechthaler |

FOREIGN PATENT DOCUMENTS

| | | | |
|---|---|---|---|
| EP | 1665889 | A2 | 7/2006 |
| EP | 2006267 | A1 | 12/2008 |
| EP | 1421040 | B1 | 5/2009 |
| WO | 2011137967 | A1 | 11/2011 |

OTHER PUBLICATIONS

Simpson, R. E., Chapter 4.8 "Conduction in Semiconductors," pp. 126 through 132, Introductory Electronics for Scientists and Engineers, Allyn and Bacon, Inc, Boston, 1977.

Van Zeghbroeck, B, Chapter 2: Semiconductor Fundamentals, Principles of Semiconductor Devices, 2011, online textbook assessable at http://ecee.colorado.edu/~bart/book/chapter2/ch2_7.htm.

* cited by examiner

APPARATUS AND METHOD TO CONTROL ELECTROMAGNETIC HEATING OF CERAMIC MATERIALS

RELATED APPLICATIONS

This application is a divisional application of co-pending U.S. patent application Ser. No. 15/605,846 filed on May 25, 2017, entitled "Apparatus and Method to Control Electromagnetic Heating of Ceramic Materials," which is a divisional application of U.S. patent application Ser. No. 14/205,354, filed Mar. 11, 2014, entitled "Method to Control Electromagnetic Heating of Ceramic Materials," which claimed priority to U.S. Provisional Patent Application No. 61/780,636, filed Mar. 13, 2013, the disclosures of each of which are hereby incorporated herein by reference in their entirety.

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

FIELD OF THE INVENTION

The present invention relates generally to the heating of ceramic materials with electromagnetic energy, and more particularly to methods of controlling the absorption of the electromagnetic energy within the ceramic material by applying electric or magnetic potentials or fields to manipulate conduction band electron populations.

BACKGROUND

In a heated ceramic, electromagnetic energy can be coupled to relatively mobile conduction band electron populations in the form of electric field forces on the charged electrons. The kinetic energy of these electrons is converted to heat through collisions within the ceramic material. In general, increased populations of conduction band electrons result in increased absorption of electromagnetic energy and, thus, increased heating of the ceramic material. Ideally, the heating of ceramic material should be controlled.

The present inventors have determined that manipulating the spatial density and relative mobility of the conduction band electron population can control electromagnetic energy absorption and thus heating within a material. This can be done according to the present inventors teaching provided herein by applying electric or magnetic potentials or fields to the heated ceramic. Additionally, by controlling how energy is absorbed within a ceramic material, it is possible to control the transparency of the heated ceramic material to electromagnetic energy, thus allowing the heated ceramic material to act as an electrically or magnetically tunable attenuator for an electromagnetic wave passing through the heated ceramic material.

There are some published inventions detailing electromagnetic heating and of ceramics using electromagnetic energy, including inventions US 2010/0025394 A1, EP 1665889 A2, EP 0979595 B1, EP 0456786 A1, EP 1421040 B1, US 20120267830 A1, U.S. Pat. No. 4,323,056, and EP 2006267 A1, but they make no mention of utilizing electric or magnetic fields or potentials to control energy absorption by and heating of the ceramic material. U.S. Pat. No.

6,993,898 describes the use of a ceramic heat exchanger, heated with an incoming electromagnetic wave, but also makes no mention of controlling energy absorption or heating of the ceramic heat exchanger through the use of applied electric or magnetic potentials or fields.

What are needed in the art are systems and methods to provide control of electromagnetic energy absorption, and thus heating, within an electromagnetically heated ceramic material. What is also needed are means to control the transparency of a heated ceramic to an incoming electromagnetic wave. These and other objects and advantages of the present invention will become more apparent from details disclosed in the following specification where preferred embodiments of the invention are described.

SUMMARY OF THE INVENTION

According to one aspect of the present invention, there is provided a ceramic material to be heated and a source of electromagnetic radiation. Additional support or insulation materials can be present in the vicinity of the ceramic material, but are not specifically required for operation of the present invention.

In accordance with another aspect of the present invention, an electric or magnetic field or potential or combination thereof can be applied to the heated ceramic to alter the amount of electromagnetic radiation that is absorbed by the material and converted to heat.

In accordance with features of the present invention that can provide a number of advantages over the current state of the art, what can be provided is enhanced and active control of electromagnetic heating of ceramic materials, mitigating the detrimental effects such as thermal runaway in electromagnetically heated materials, providing variable attenuation of high power electromagnetic energy using heated ceramic materials, and controlling energy absorption and heating of ceramic heat exchangers independent of the power level of the electromagnetic energy source providing the heating.

DESCRIPTION OF THE DRAWINGS

For a better understanding of the present invention, and to show how the same may be carried into effect, reference will now be made, by way of example, to the accompanying drawings in which.

DETAILED DESCRIPTION

Figure 1:
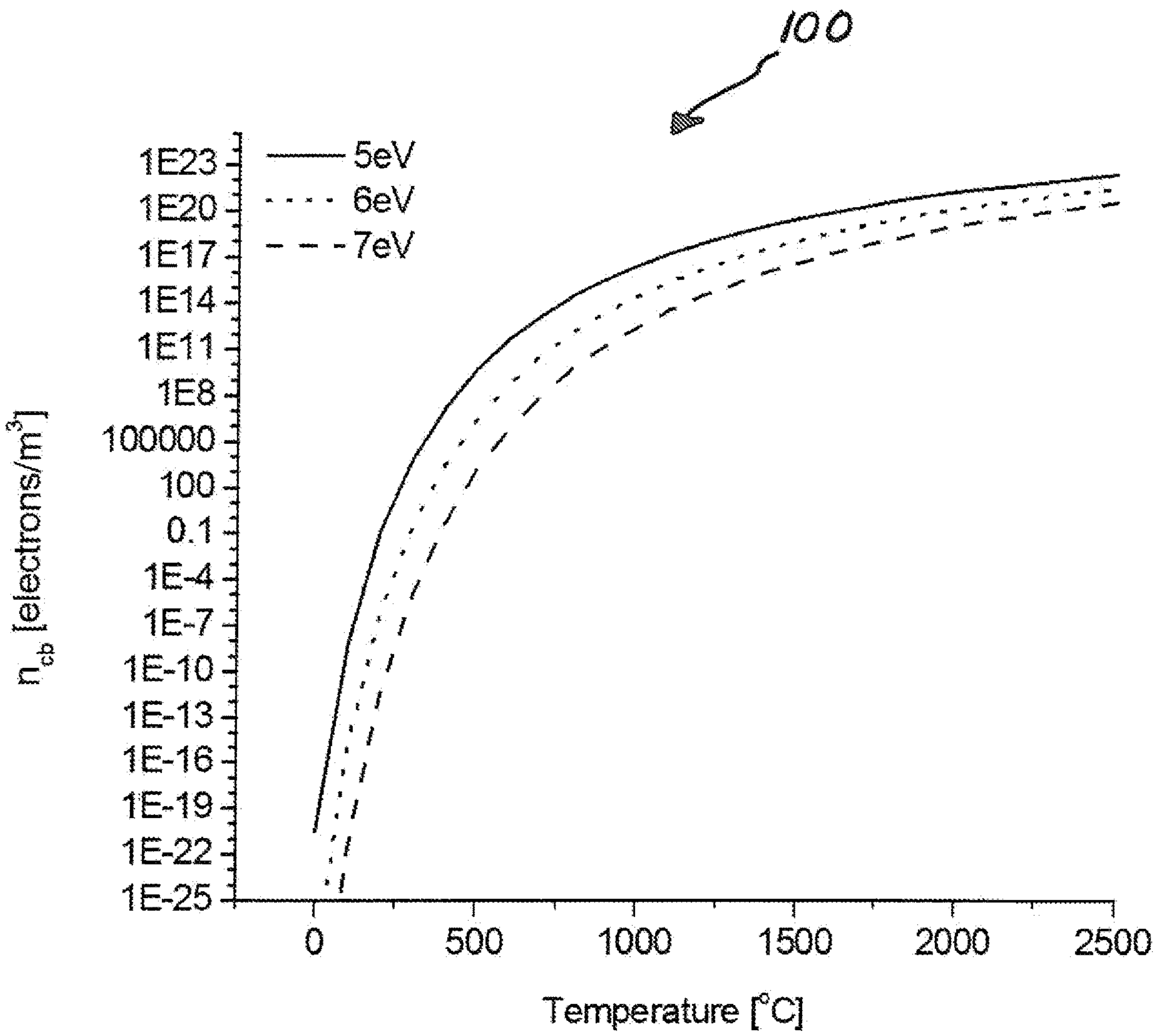
FIG. 1 is a plot of calculated conduction band electron density as a function of temperature for hypothetical materials with band gaps ranging from 5 eV to 7 eV.

The conduction band population of a heated ceramic material can be estimated using the equation $$n_{cb} = \left(\left(\frac{2\pi kT}{h^2}\right)^{\frac{3}{2}} m_e^{*\frac{3}{2}}\right)\exp\left(-\frac{E_g}{2kT}\right) \quad (1)$$

where k is the Boltzmann constant, T is temperature, h is Planck's constant, Eg is the energy separation between the conduction and valence bands of the material and $m_e$* is the effective mass of a conduction band electron within the material. At this point, for the purposes of this analysis, two assumptions are made: 1) the effective electron mass is equal to the rest mass of a free electron and 2) that the valence band holes created by promoting electrons to the conduction band are effectively stationary. FIG. 1 depicts a chart 100 of calculated conduction band electron density as a function of temperature for band gaps ranging from 5 to 7 eV.

From the calculated conduction band population, it is possible to make predictions regarding the bulk conductivity of a heated ceramic, using the relation $$\sigma = n_{cb}|e|\mu_e \quad (2)$$

where $n_{cb}$ is the conduction band population from equation (1), e is the charge of an electron, and $\mu_e$ is the electron mobility, and the electrons are the majority of mobile charge carriers. It is known that electron mobility, $\mu_e$ changes as a function of temperature, but over narrow temperature ranges, it can be considered to be approximately constant. This means that at a given temperature, bulk conductivity is proportional to conduction band population.

From Maxwell's equations, $$\begin{aligned} \nabla \times H &= j\omega D + J \quad (3) \\ &= j\omega D + \sigma E \\ &= j\omega \epsilon E + \sigma E \\ &= j\omega \epsilon' E + (\omega\epsilon'' + \sigma)E \\ &= j\omega\left(\epsilon' - j\epsilon'' - j\frac{\sigma}{\omega}\right)E \end{aligned}$$

where J is the current density, σ is the material conductivity, E is the RF electric field, H is the RF magnetic field, ϵ' is the real portion of the permittivity, ϵ" is the imaginary portion of permittivity due to dielectric damping, and ω is 2π times the electric field frequency. The loss tangent, tan δ, commonly used to denote power lost to the material by the electromagnetic wave is defined as $$\tan\delta = \frac{\omega\epsilon'' + \sigma}{\omega\epsilon'}. \quad (4)$$

Because electromagnetic heating of high temperature ceramics is generally dominated by material conductivity, the dielectric damping term, ωϵ" is neglected, leaving $$\tan\delta \cong \frac{\sigma}{\omega\epsilon'} \propto n_{cb}. \quad (5)$$

From equation 5 it is clear that the energy lost in the material by an incoming electromagnetic wave (and converted to heat) is proportional to the number density of electrons in the conduction band.

Methods Using Electric Potentials

In most applications involving heating of a sample using cm or mm wavelength electromagnetic waves, it is desirable to be able to control the amount of heating experienced by the material. There are circumstances in which altering the output power of the radiation source or placing attenuators in the path of the beam are either undesirable or unviable options.

As described in the previous section, if dielectric damping is neglected, heating of a ceramic material from an incoming electromagnetic wave is primarily due to the bulk conductivity of the material. This bulk conductivity is approximately proportional to the density of electrons in the conduction band. This suggests that another way to control the heating of a material is to manipulate the conduction band electron population and thus change the way the material absorbs the incoming electromagnetic energy.

Figure 2:
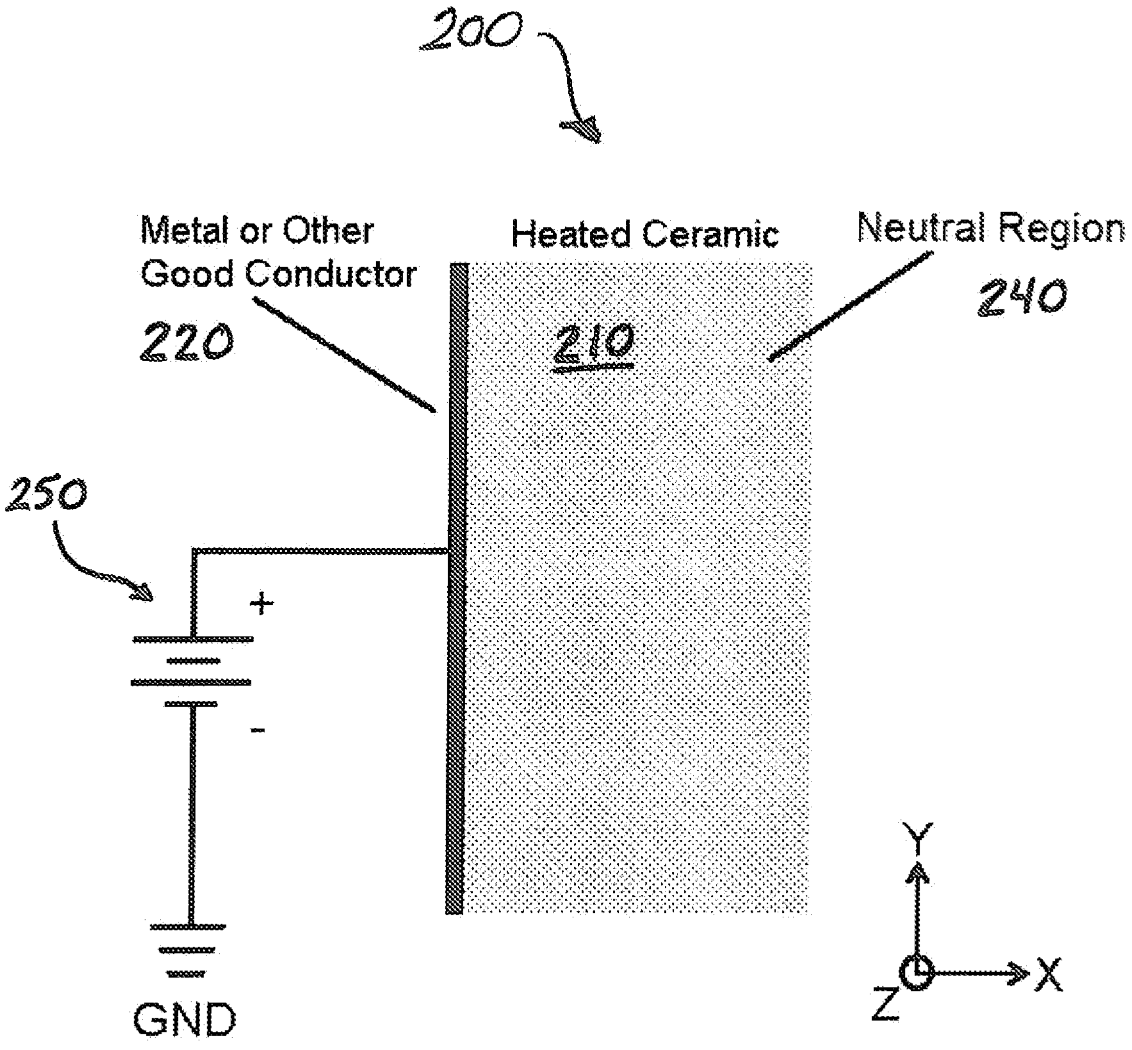
FIG. 2 depicts an example of the present invention using simplified geometry in which a conductor is placed in electrical contact with the heated ceramic and an electric potential is applied via a bias voltage.

The present inventors have found a way to change the spatial distribution of conduction band electron population, which is shown by the illustration of a heated ceramic 200 in FIG. 2. Electrically conductive material such as a conductor plate 220 can be placed in electrical contact with the hot ceramic material 210. A neutral region 240 of the ceramic material 210 is located next to the conductor plate 220. In this example it can be assumed that the ceramic material 210 and the conductor plate 220 are infinite in the Y and Z directions, effectively reducing the arrangement to a 1-D system (in the X direction).

Figure 3:
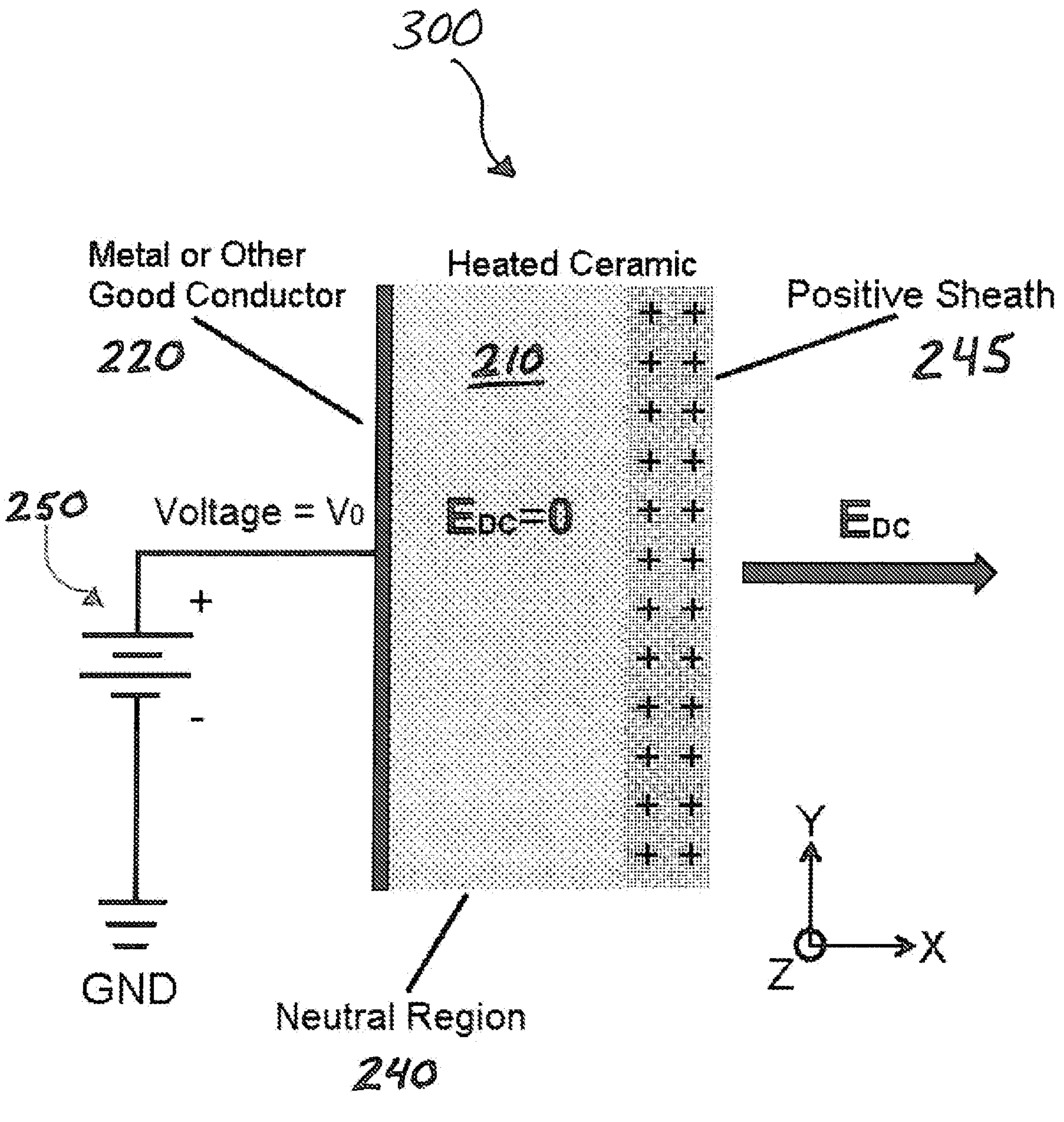
FIG. 3 depicts an example of the present invention showing conduction band electron reconfiguration due to an applied bias voltage such that a sheath is formed.
Figure 4:
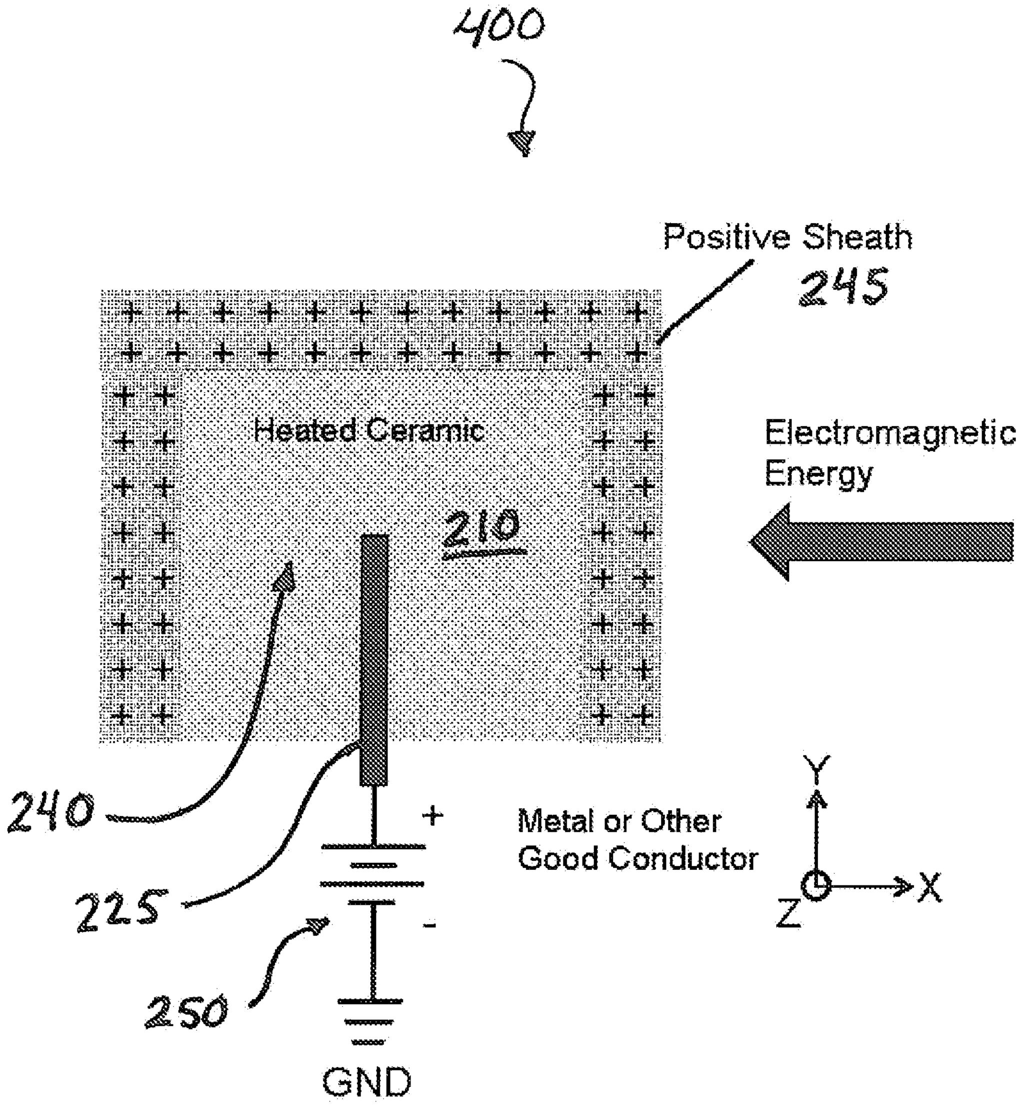
FIG. 4 depicts another embodiment of the present invention in which the electric potential is applied to a conducting rod embedded in the heated ceramic.

As illustrated in the diagram 300 in FIG. 3, if a positive voltage bias 250 is applied to the conductor plate 220, mobile electrons will flow through the neutral region 240 toward the conducting plate 220 until a positive sheath 245 is formed on the right-hand side of the ceramic material 210, that is, to the right of the neutral region 240. A positive bias potential 250 is used in this example; however, it should be appreciated that the conducting plate 220 could also be biased negatively. Within the sheath 245, electrons are depleted, leaving a combination of positively charge ions and neutral atoms (giving the sheath 245 an overall positive charge when a positive bias is applied). The sheath 245 will continue to expand until the potential due to the exposed positive charge on the right hand side (sheath 245) balances the potential due to the positively biased conducting plate 220, such that the electric field in the neutral region 240 between the conducting plate 220 and the sheath 245 is zero. Alternatively, if the applied bias was negative, positive sheath 245 would lie adjacent conducting plate 220. It is possible to generate this type of sheath effect in more complicated geometries by using embedded electrodes 225, such as that shown in the diagram 400 of FIG. 4; however, for simplicity, the example geometry provided in FIG. 3 will continue to be used.

Conceptually, a heated ceramic 210 having enough thermal energy to promote some of its electrons to the conduction band can be viewed as plasma. Like electrons in a plasma, the conduction band electrons are free to move about an arrangement of positively charged ions; however, unlike ions in a typical plasma, the background lattice ions in a solid are effectively stationary. For the present discussion, the issue of ion mobility is ignored.

An estimate of the sheath thickness can be made by replacing the heated ceramic in FIG. 3 with a zero temperature plasma (plasma is in electrostatic equilibrium with zero electron motion) in which the plasma density is set equal to the conduction band electron population of the heated ceramic ($n_{cb}=n_p$). In this configuration, the sheath thickness, s, at a given applied voltage, $V_0$ follows the relation $$S=\sqrt{\frac{2V_0\epsilon_0}{n_p e}}. \tag{6}$$

Figure 5:
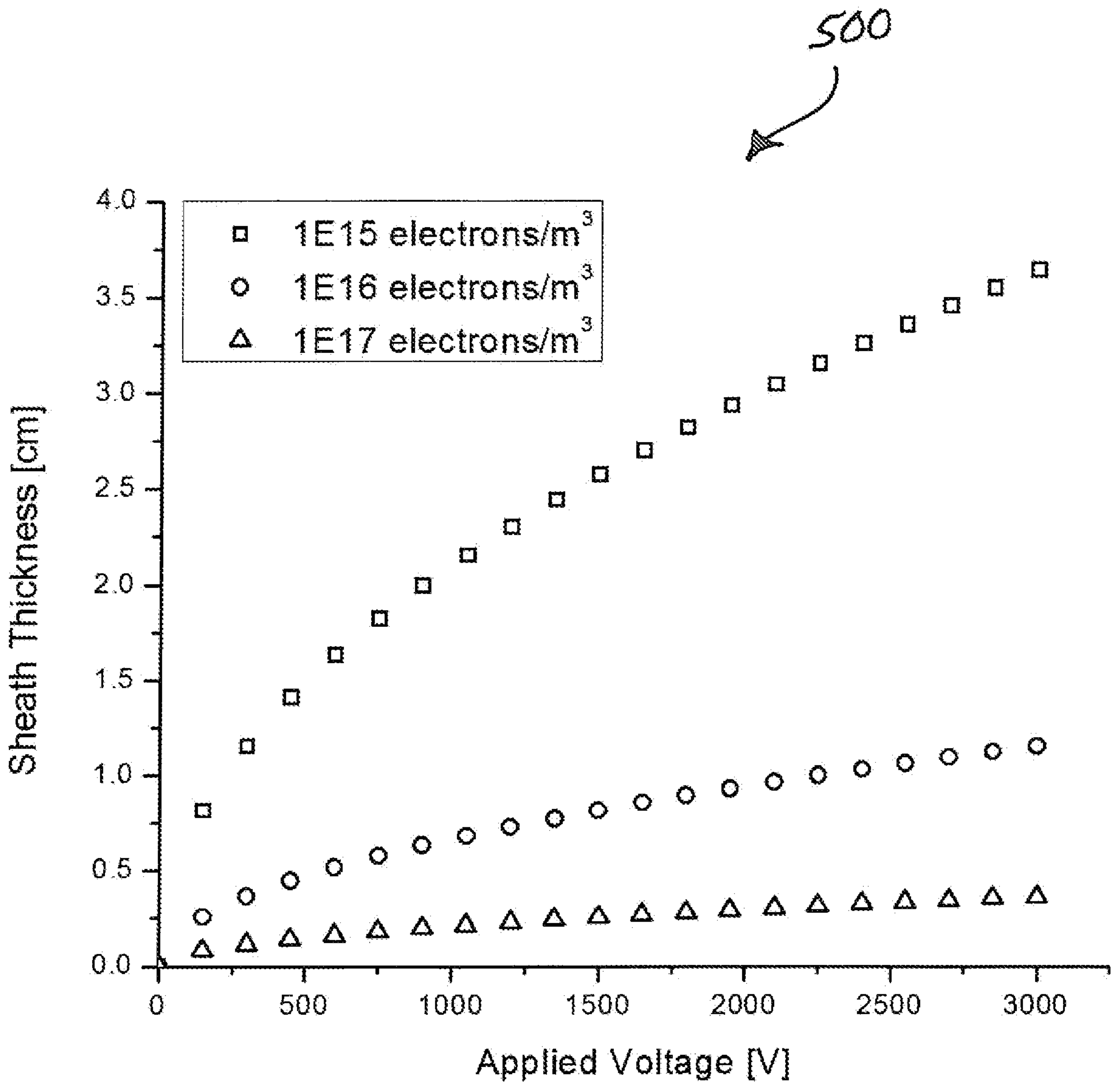
FIG. 5 depicts a plot of estimated sheath thickness as a function of applied voltage for the geometry depicted in FIG. 3.

FIG. 5 depicts a chart 500 0f sheath thickness calculations based on equation 6 for three different conduction band electron densities. In actuality, due to electron mobility, sheath boundaries will not be as well defined as in the zero temperature models. Additionally, this analysis ignores the secondary sheath formed due to thermal motion of conduction band electrons in areas where the conductor contacts the ceramic material. This secondary sheath is not of interest in the present discussion, as it is not as strongly affected by applied DC electric fields or potentials as the primary sheath.

As described previously, and as shown by equation 5, the power absorbed in the ceramic is proportional to the conduction band electron density. When a positive voltage is applied to the conductors in contact with or embedded in the ceramic, the formation of the positive sheath creates a region in which electromagnetic energy is much less readily absorbed due to the reduced density of electrons in this region. In this manner, by controlling the location of the sheath boundary, it is possible to control where in the material that the majority of the heating will occur.

Figure 6:
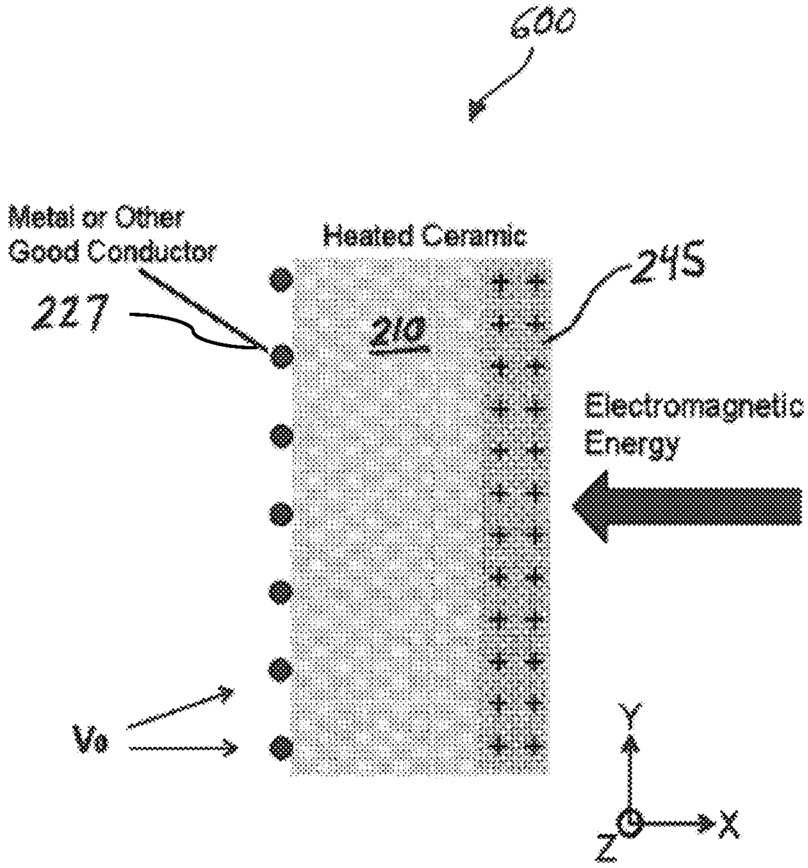
FIG. 6 depicts an embodiment of the present invention in which a potential is applied to multiple bias electrodes oriented orthogonal to the incoming electric field polarization.

In certain configurations, such as the diagram 600 shown in FIG. 6, the sheath-forming effect could be used as an electrically controllable attenuator for the electromagnetic energy. Specifically, when no bias is applied to the conduction wires 227 (lying along the Z axis), the hot ceramic attenuates the incoming electromagnetic radiation. When a voltage is applied to the wires and a positive sheath is formed, more electromagnetic energy will pass through the assembly due to reduced absorption in the sheath region. It should be noted that in this configuration, the electric field would be preferably oriented in a direction orthogonal to the direction of the wires. It can be appreciated, however, that the wires could be oriented such that the Rf electric field is not exactly orthogonal, but such a configuration would be less desirable because of increased coupling of the RF energy to the wires.

Methods Using Magnetic Fields

Figure 7:
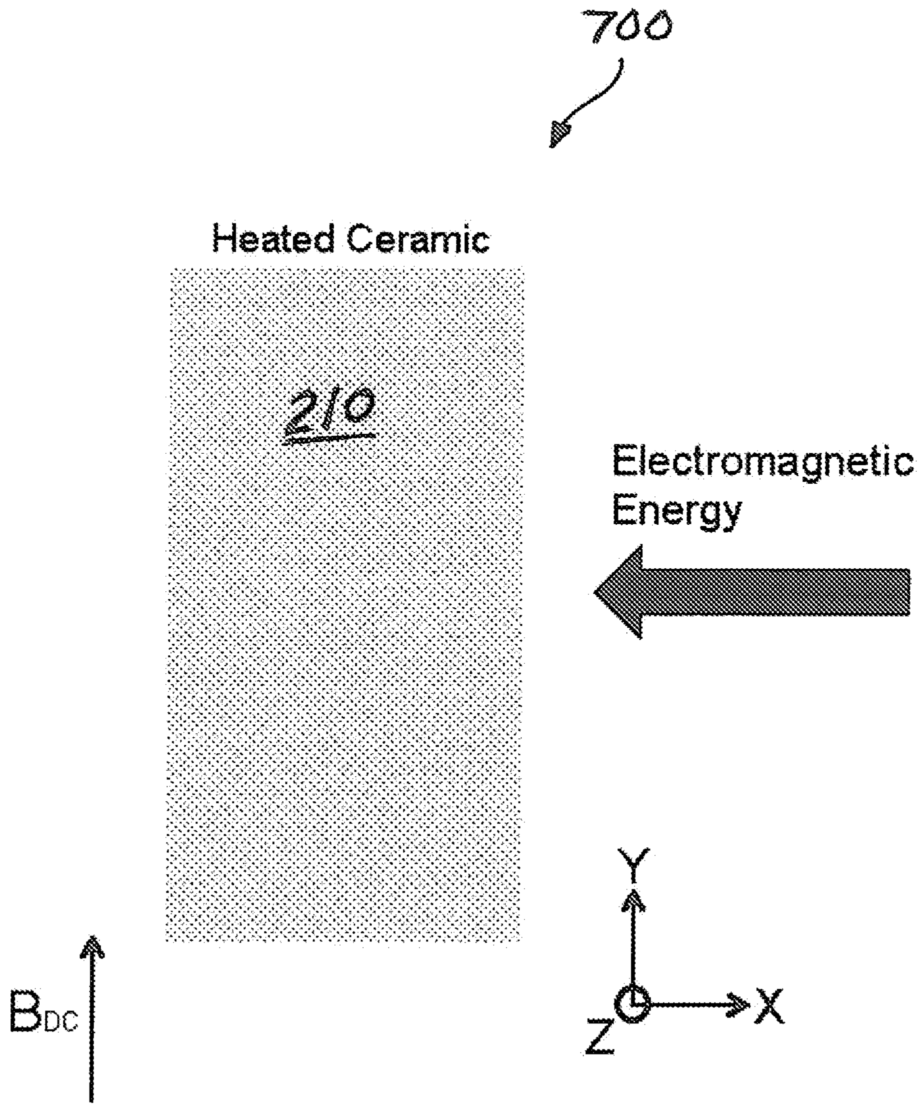
FIG. 7 depicts an embodiment of the present invention in which an electromagnetic wave is incident on a ceramic immersed in a magnetic field.

Instead of using an electric field, as described previously, it is also possible to control electromagnetic heating in a ceramic by applying a magnetic field, as shown in the diagram 700 in FIG. 7. In plasma, applying a magnetic field can alter the motion and mobility of charged particles. In reference to plasma, charged particles, specifically electrons in the present case, gyrate around magnetic field lines in a plane perpendicular to the direction of the magnetic field lines at the location of the charged particle. Because of this effect, electrons are prevented from moving across magnetic field lines, but are free to move along the direction of the magnetic field lines. A similar effect occurs with the conduction band electrons in a heated ceramic when immersed in a magnetic field.

When the electric field polarization of incoming electromagnetic radiation is oriented normal to an applied magnetic field, the decreased electron mobility in the direction of the incoming electromagnetic radiation will reduce the degree to which the electrons can interact with the electromagnetic wave. As a result, the magnetized portion of the ceramic will absorb less energy. If the electric field of the incoming electromagnetic wave is polarized parallel to the DC magnetic field, the wave will more readily couple to the electrons due to the increased electron mobility in that direction, thus resulting in heating close or equal to the unmagnetized case.

It is possible to use an applied magnetic field to enhance energy absorption in the heated ceramic with respect to the unmagnetized case. If the magnetic field is set such that the gyration frequency of the electrons, or cyclotron frequency, is equal to that of the incoming electromagnetic wave, the electrons will resonantly absorb energy from the wave and transfer it as heat to the surrounding material via collisions. The cyclotron frequency, $f_c$, in the presence of an applied magnetic field, B, is defined as $$f_c=\frac{|e|B}{2\pi m_e^*}. \tag{7}$$

In regions where the magnetic field is such that the incoming electromagnetic energy is at or close to the cyclotron frequency, absorption of the electromagnetic energy in the heated ceramic material will be greater than in unmagnetized cases or cases where the applied magnetic field is such that the cyclotron frequency is sufficiently different from the frequency of the incoming electromagnetic wave.

We claim:

1. An apparatus to control electromagnetic heating of ceramic material caused by impinging electromagnetic radiation, comprising:

a ceramic material having a population of electrons in a conduction band and having a bulk conductivity;

an electrode embedded in the ceramic material;

a voltage source for being applied to the electrode and for creating a voltage bias in the electrode and a sheath in the ceramic material; and the sheath having a first region having a size, a location and a first electron density lower than an outside electron density for the ceramic material lying outside of the first region, whereby the bulk conductivity of the ceramic material can be controlled by controlling the location and the size of the first region; wherein the bulk conductivity of the ceramic material is proportional to the electron density of the first region, and the bulk conductivity is related to the heat absorbed based on the amount of electromagnetic energy absorbed.

2. The heating control apparatus as defined in claim 1 wherein the voltage bias has a polarity which is positive or negative.

3. The heating control apparatus as defined in claim 2 wherein:

the sheath is comprised of a positive sheath having a positive charge and a neutral sheath having a neutral charge and lying adjacent the positive sheath, and further comprising;

the positive and neutral sheaths each having respective electron densities lower than an electron density for the ceramic material lying outside of the sheath.

4. The heating control apparatus as defined in claim 2 wherein the location of the sheath relative to the electrode is controlled by the polarity of the voltage bias.

5. The heating control apparatus as defined in claim 2 wherein:

the voltage bias has an adjustable magnitude; and the positive sheath has a size proportional to the magnitude of the voltage bias.

6. An apparatus to control electromagnetic heating of ceramic material caused by impinging electromagnetic radiation, comprising:

a ceramic material having a population of electrons in a conduction band and having a bulk conductivity;

an electrode embedded in the ceramic material;

a voltage source for being applied to the electrode and for creating a voltage bias in the electrode and an electron sheath in the ceramic material; and the electron sheath having an electron sheath electron density greater than an outside electron density for the ceramic material lying outside of the electron sheath, whereby the bulk conductivity of the ceramic material can be controlled by controlling the location and the size of the first region; wherein the bulk conductivity of the ceramic material is proportional to the electron density of the first region, and the bulk conductivity is related to the heat absorbed based on the amount of electromagnetic energy absorbed.

7. The heating control apparatus as defined in claim 6 wherein the voltage bias has a polarity which is positive or negative.

8. The heating control apparatus as defined in claim 7 further comprising the voltage bias being for creating a neutral sheath in the ceramic material having a neutral charge and lying adjacent the electron sheath.

9. The heating control apparatus as defined in claim 7 wherein the voltage bias has a variable magnitude and the electron sheath size is proportional the magnitude of the voltage bias.

10. The heating control apparatus as defined in claim 9 wherein the location of the electron sheath relative to the electrode is controlled by the polarity of the voltage bias.

11. The heat controlling method as defined in claim 10 wherein electromagnetic radiation is applied to the ceramic material at wavelengths ranging from centimeters to millimeters.

* * * * *